United States Patent [19]

Röck et al.

[11] Patent Number: 4,579,474
[45] Date of Patent: Apr. 1, 1986

[54] JOINING DEVICE

[75] Inventors: Erich Röck, Höchst; Helmut Hollenstein, Dornbirn, both of Austria

[73] Assignee: Julius Blum Gesellschaft m.b.H., Höchst, Austria

[21] Appl. No.: 476,371

[22] Filed: Mar. 17, 1983

[30] Foreign Application Priority Data

Apr. 1, 1982 [AT] Austria ............... 1284/82

[51] Int. Cl.$^4$ .................... B25G 3/00; F16B 9/00
[52] U.S. Cl. .................... 403/245; 403/323; 403/407.1
[58] Field of Search ............. 403/231, 245, 406, 407, 403/323

[56] References Cited

U.S. PATENT DOCUMENTS

| 459,361 | 9/1891 | Gregory | 403/323 |
| 3,129,472 | 4/1964 | Hensel | 403/231 X |
| 4,047,822 | 9/1977 | Lehmann . | |
| 4,089,614 | 5/1978 | Harley . | |
| 4,202,645 | 5/1980 | Giovannetti | 403/407 |
| 4,292,003 | 9/1981 | Pond | 403/231 X |
| 4,325,649 | 4/1982 | Rock | 403/407 X |
| 4,348,130 | 9/1982 | Lautenschlaeger . | |
| 4,360,282 | 11/1982 | Koch . | |

FOREIGN PATENT DOCUMENTS

| 352940 | 10/1979 | Austria . |
| 3011788 | 10/1981 | Fed. Rep. of Germany . |
| 2442365 | 6/1980 | France . |
| 1295470 | 11/1972 | United Kingdom . |
| 2074283 | 10/1981 | United Kingdom . |

Primary Examiner—Andrew V. Kundrat
Attorney, Agent, or Firm—Wenderoth, Lind & Ponack

[57] ABSTRACT

A device for joining furniture panels includes a dowel casing with a holding member for holding the head of a screw or the like when the latter is inserted into the dowel casing. The dowel casing is insertable into a hole in one panel and the screw is to be screwed into another panel. The dowel casing is a one-part casing open at the bottom or inserted end thereof.

6 Claims, 8 Drawing Figures

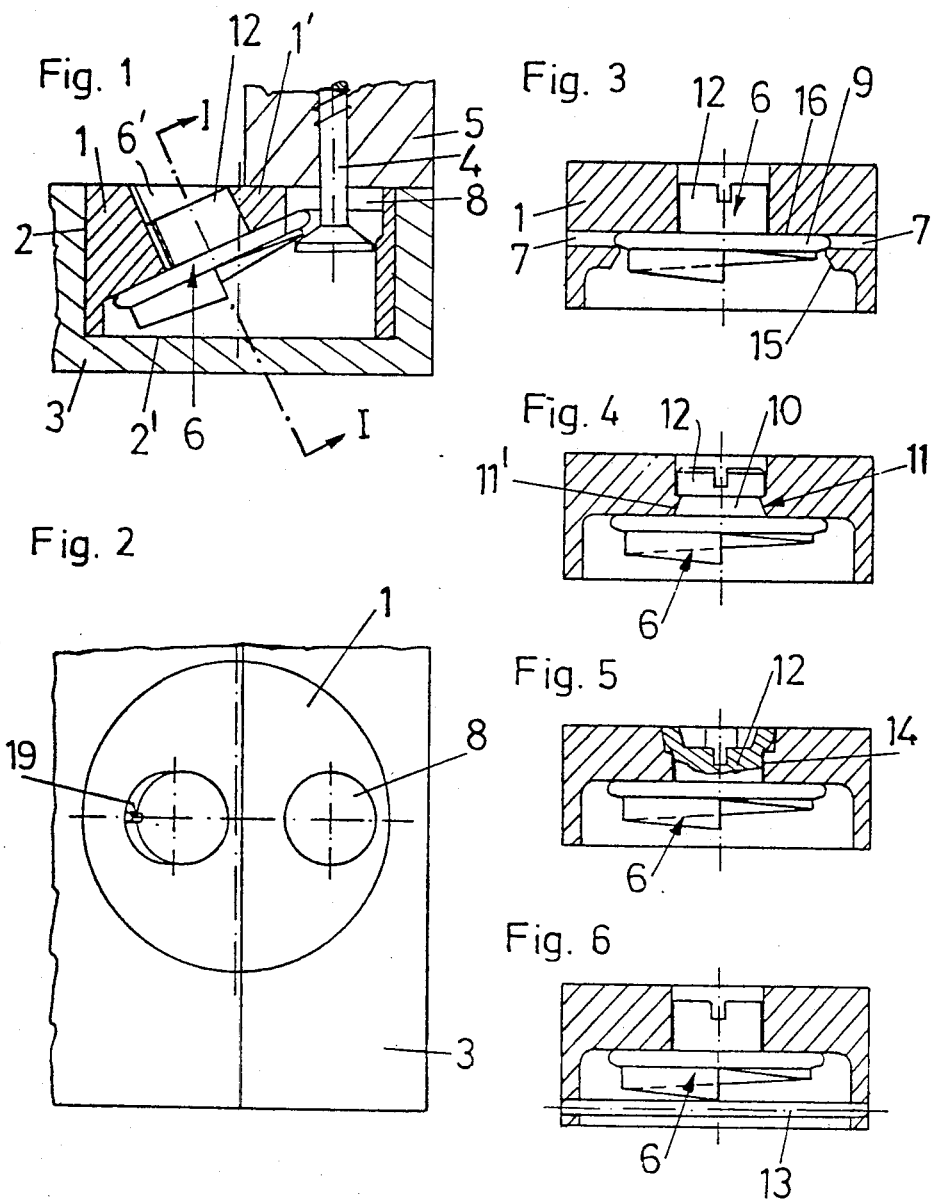

JOINING DEVICE

FIELD OF THE INVENTION

This invention relates to a joining device for joining together at right angles two furniture parts, and including a cylindrical dowel casing adapted to be inserted into a bore of one furniture part, such dowel casing having an aperture into which a pin-like connecting member, e.g. a dowel pin or a screw, adapted to be fitted into the other furniture part is eccentrically insertable with its head and fastenable to the dowel casing by means of a holding member in the dowel casing, the holding member being immovably retained in the dowel casing in the axial direction and provided with a holding surface in the form of a screw or a cam pressing on the head of the pin-like connecting member in the mounted position.

BACKGROUND OF THE INVENTION

Joining devices of this kind are frequently and preferably used for releasably joining two cabinet walls. The dowel casing is generally inserted at the edge of the side face of one cabinet wall, while the other pin-like connecting member is inserted into the front side or edge of the furniture wall to be connected.

Then, the furniture parts are put together, the head of the connecting member is inserted into the aperture in the dowel casing and is held by means of the holding member.

To permit insertion of the holding member into the dowel casing known joining devices of this kind have a two-part dowel casing so that it can be opened to receive the holding member, and then the two halves of the dowel casing are closed together again and pressed into the bore of the respective furniture part.

One-piece dowel casings are known, but only with joining devices in which the holding member is a screw which is axially displaced when turned in the dowel casing. Such holding members do not have, however, the desired holding properties, and problems arise in particular in the transmission of forces from the holding member to the dowel casing. Further, the screwing-in of the holding member takes place when the fitting is assembled.

SUMMARY OF THE INVENTION

It is the object of the invention to provide a joining device of the afore-mentioned kind in which the dowel casing can be a one-piece housing without the holding member having to be a screw.

According to the invention this is achieved by a one-piece dowel casing which is open at its front end directed into the bore and by a holding member being rotatably retained by means of a lateral projection or projections of the housing of the dowel casing.

This design of the dowel casing and the joining device has essential advantages when automatically mounting the holding member in the dowel casing.

One embodiment of the invention provides that the holding member has an annular rim projection extending into a corresponding recess of the dowel casing.

A further embodiment provides that the holding member has a retaining base with a tapered portion, a projection of the dowel casing retaining the holding member at the tapered portion. The fit of the holding member in the dowel casing can be improved by riveting the holding member of the retaining base in the dowel casing.

A further embodiment provides that a projection of the dowel casing is formed by a pin extending through the casing transversely to the inserting direction thereof and resting against the inner end of the holding member.

According to a further feature of the invention, the dowel casing wall in the region of the projections and recesses is provided with apertures, e.g. four apertures disposed in diametrically opposite arrangement, which facilitate removal of the injection molded dowel casing from a mold.

BRIEF DESCRIPTION OF THE DRAWINGS

In the following the invention will be described in greater detail with reference to the accompanying drawings without being limited to the illustrated embodiments, and wherein:

FIG. 1 is a sectional view of a connection of two furniture parts by means of a joining device according to the invention, FIG. 2 is a top view of a joining device of FIG. 1 according to the invention, FIGS. 3 to 6, are sectional views, each taken along line I—I of FIG. 1 but of different embodiments of the invention, the holding member being turned by 90°.

DETAILED DESCRIPTION OF THE EMBODIMENTS

Figure 7:
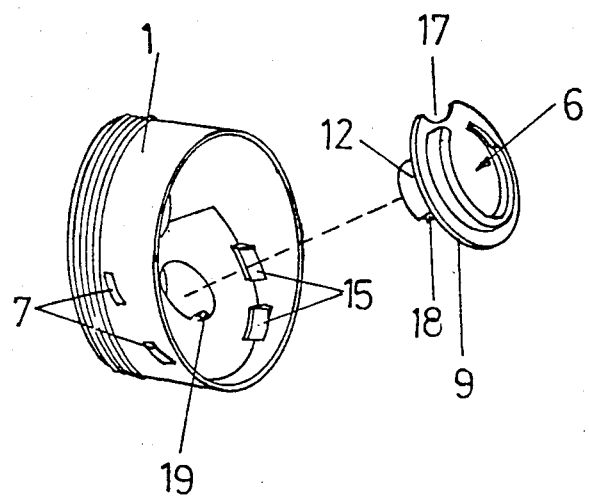
FIG. 7 is an exploded perspective view of the dowel casing and holding member according to the invention.
Figure 8:
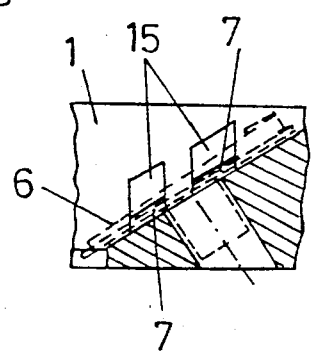
FIG. 8 is a partial sectional view of a portion of FIG. 7.

As can be seen from FIG. 1, a dowel casing 1 according to the invention is inserted into a bore 2 at the edge of a side face of a furniture wall 3. A joining member 4, which is a screw in the illustrated embodiment, extends into the front face of a corresponding furniture wall 5. In the mounted position of the piece of furniture the dowel casing 1 and the joining device 4 are connected by means of a holding member 6. The dowel casing 1 is in the shape of a cylindrical member having an open lower end, as viewed in FIG. 1, and an upper end closed by an integral transverse portion 1' having therein an inclined orifice 6' into which extends a base 12 of a holding member 6. Base 12 is accessible from the upper end of dowel casing 1 and has a tool engaging portion, as shown in FIG. 2, by which holding member 6 may be rotated about the axis of base 12.

To improve the fit of the dowel casing 1 in the furniture wall 3, casing 1 may be provided with external circumferential gripping ribs.

When pressing the dowel casing 1 into the furniture wall 3, particular attention must be paid that an aperture 8 in transverse portion 1 for receiving the joining device 4 is exactly aligned with the position of the joining device 4 in the mounting position.

As can be seen from the drawings, the dowel casing 1 is made in one piece and is open at its lower end directed towards the bottom 2' of the bore in the furniture part 3. The holding member 6 can, hence, be inserted from the lower side, i.e. from the open lower end, into the dowel casing 1.

In the embodiment according to FIG. 3 the dowel casing has recesses formed by projections 15 and in which an annular rim 9 of the holding member 6 engages, with rim 9 abutting an inner surface 16 of transverse portion. The holding member 6 thus latches in the dowel casing 1. In the embodiment according to FIG. 4 the base 12 of the holding member 6 is a retaining base having a tapered portion which is engaged by a projection 11 of the dowel casing 1. The projection 11 has an inclined surface 11' facilitating insertion of the holding member 6 and its retaining base 12. In this case a latching effect occurs.

In the embodiment according to FIG. 5 the retaining base 12 is widened in a rivet-like manner after insertion of the holding member 6 into the dowel casing 1 to ensure the fit of the holding member 6 in the dowel casing 1 and forming a projection 14 of casing 1 to extend into a narrowed portion of base 12.

In the embodiment according to FIG. 6, the projection retaining the holding member 6 is formed by a pin 13 which may, for example, be a metal pin inserted into the side wall of the dowel casing.

In all cases, the holding member 6 is retained between radially inwardly extending projections 11, 13, 14, 15 of the dowel casing 1.

FIG. 7 shows a perspective exploded view of the embodiment of FIG. 3. Apertures 7 between the projections 15 and surface 16 are provided in the wall of the casing and facilitate removing of the injection molded dowel casing 1 of plastic material from the mold.

To facilitate the adjustment of the holding member 6 into the "open position" in which a recess 17 therein is exactly below the aperture 8, thus enabling the screw 4 to move past the holding member 6, the retaining base 12 is provided with a notch 18 into which engages a projection 19 of the dowel casing 1.

What is claimed is:

1. A joining device for joining at right angles two furniture parts, said joining device comprising:
   a plastic cylindrical dowel casing adapted to be inserted into a bore in one furniture part;
   said dowel casing having an open first end to be directed into the bore and a second end closed by an integral transverse portion having therethrough an inclined orifice;
   an aperture extending eccentrically through said transverse portion for receipt therethrough of a head of a connecting pin to be fastened to the other furniture part;
   a holding member rotatably mounted in said transverse portion of said dowel casing, said holding member including a base accessible from said second end of said dowel casing and engageable by a tool for rotation of said holding member about said base;
   said holding member having a cam surface portion facing said open first end and adapted to press on the head of the connecting pin upon rotation of said holding member;
   said holding member having an annular rim extending radially outwardly beyond said cam surface portion to form with one side a radial shoulder therebetween and with its opposite side abutting on said transverse portion of said dowel casing;
   said dowel casing comprising an integral one-piece member of rigid construction throughout, such that said base of said holding member is insertable from said open first end of said dowel casing into said aperture until said rim abuts said transverse portion; and
   said dowel casing including at least one projection retaining said holding member in said dowel casing to prevent relative axial movement therebetween.

2. A device as claimed in claim 1, wherein said dowel casing has a plurality of integral projections extending inwardly and spaced from said transverse portion to define therebetween recesses, with said rim extending into said recesses.

3. A device as claimed in claim 2, wherein said dowel casing has extending laterally therethrough a plurality of apertures adjacent said recesses and said projections.

4. A device as claimed in claim 1, wherein said base of said holding member has a reduced diameter portion defined by a surface tapering inwardly toward said first end, and said dowel casing has an integral projection extending into said reduced diameter portion toward said tapering surface.

5. A device as claimed in claim 1, wherein the outer end of said base is riveted to widen said outer end.

6. A device as claimed in claim 1, wherein said projection comprises a pin retained by and extending across said dowel casing and abutting the inner end of said holding member.

* * * * *